United States Patent

Basstein et al.

Patent Number: 5,494,475
Date of Patent: Feb. 27, 1996

[54] TOOL FOR PRODUCING CROWN WHEELS, AND METHOD FOR PRODUCING SUCH A TOOL

[75] Inventors: Augustinus F. H. Basstein, Prinsenbeek; Gustaaf A. Uittenbogaart, Overveen, both of Netherlands

[73] Assignee: Crown Gear B.V., Netherlands

[21] Appl. No.: 50,410

[22] PCT Filed: Nov. 29, 1991

[86] PCT No.: PCT/NL91/00245

§ 371 Date: May 14, 1993

§ 102(e) Date: May 14, 1993

[87] PCT Pub. No.: WO92/09395

PCT Pub. Date: Jun. 11, 1992

[30] Foreign Application Priority Data

Nov. 29, 1990 [NL] Netherlands .................. 9002611

[51] Int. Cl.$^6$ .................. B23F 23/10; B23F 5/08
[52] U.S. Cl. .................. 451/47; 407/28; 451/547
[58] Field of Search .................. 451/47, 547, 542, 451/147, 161; 407/24, 26, 28, 23

[56] References Cited

U.S. PATENT DOCUMENTS

| | | | |
|---|---|---|---|
| 1,398,039 | 11/1921 | Olson | 407/20 |
| 2,304,586 | 12/1942 | Mille | 407/23 |
| 2,308,891 | 1/1943 | Miller | 409/39 |
| 4,954,028 | 9/1990 | Seroo et al. | 451/47 |
| 5,288,179 | 2/1994 | Cuypers et al. | 407/23 |

FOREIGN PATENT DOCUMENTS

| | | |
|---|---|---|
| 0564635 | 11/1932 | Germany . |
| 0683514 | 11/1939 | Germany . |
| 0899747 | 12/1953 | Germany . |
| 0183620 | 6/1960 | Germany . |
| 1124786 | 3/1962 | Germany . |
| 0082608 | 9/1956 | Netherlands . |
| 0946833 | 7/1982 | U.S.S.R. . |
| 0230884 | 4/1925 | United Kingdom . |

OTHER PUBLICATIONS

Bulletin of the JSME, vol. 21, No. 155, issued 1978; K. Shinjo et al., "Development of a New Type Cutter 'Revolving Pinion Cutter' for the Hobbing of the Face Gear", pp. 899–906.

Primary Examiner—Robert A. Rose
Attorney, Agent, or Firm—Ostrolenk, Faber, Gerb & Soffen

[57] ABSTRACT

A tool for producing crown wheels by means of a generating process comprises a disc which is rotatable about its axis, with machining elements which are provided on the periphery thereof and the cutting edges of which lie in the outer surface of a profile determining the shape of the teeth of a crown wheel to be produced with the tool, said profile extending essentially helically over the periphery of the disc. In each cross-section of the helical profile the outer contour (25) of the cross-section is at least of a part of the outer contour of the tooth profile of an imaginary gear wheel (23) with involute teeth and preferably straight lines connecting thereto, in such a way that in the case of each of the teeth (22) with a tooth tip and two tooth flanks bounded by the outer contour (25) of the cross-section the distance between each of the two tooth flanks and a line at right angles to the axis of rotation of the tool and passing through the tooth tip remains the same or increases from the tooth tip to the axis of rotation of the tool.

19 Claims, 6 Drawing Sheets

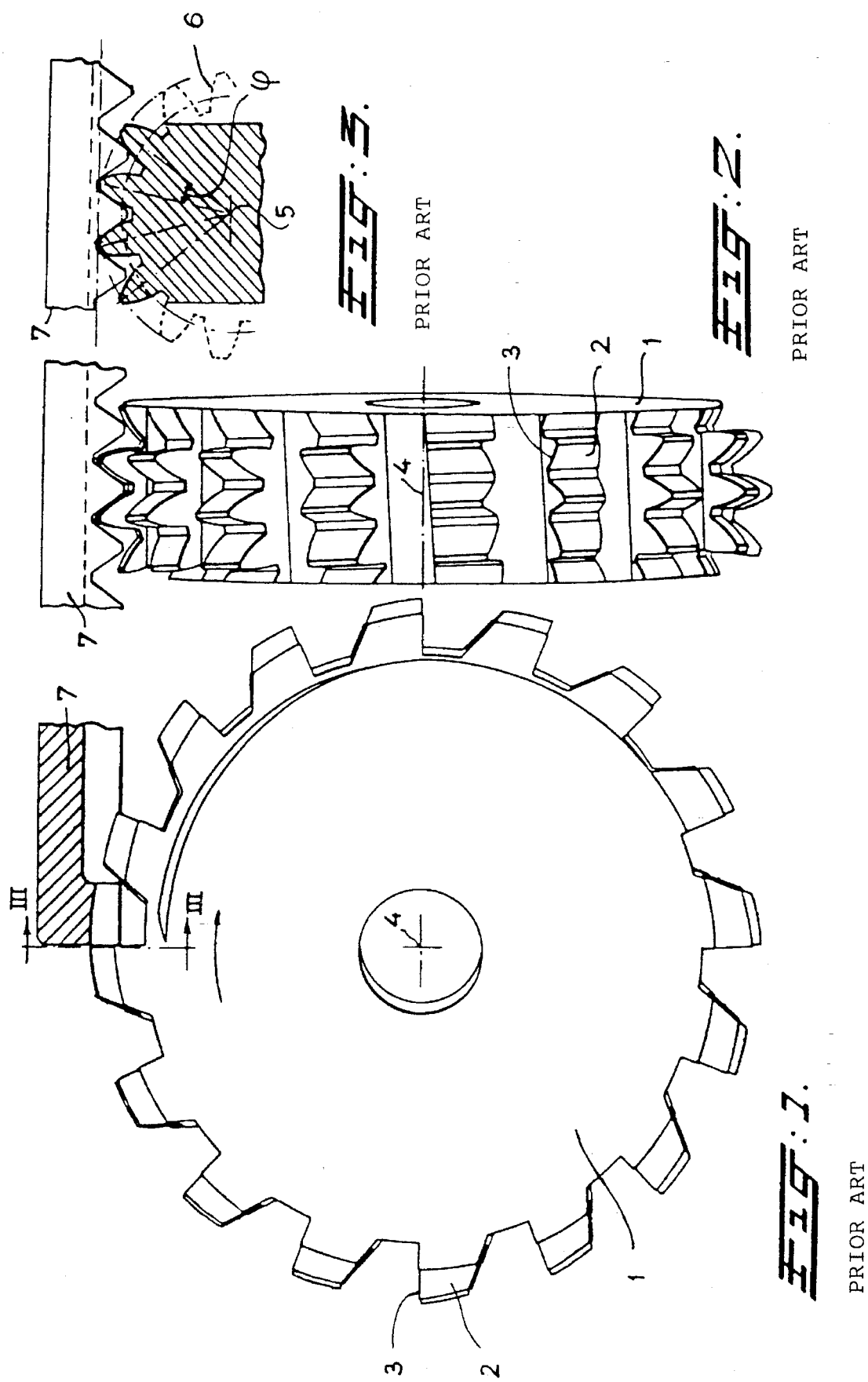

TOOL FOR PRODUCING CROWN WHEELS, AND METHOD FOR PRODUCING SUCH A TOOL

BACKGROUND FOR THE INVENTION

The invention relates to a tool for producing crown wheels by means of a generating process.

Crown wheels are gear wheels which are used in angle drives with or without intersecting axes Which may or may not form an angle of 90° with each other. In this drive a cylindrical pinion meshes with a crown wheel whose tooth shape is determined by the tooth shape of the cylindrical pinion, the gear ratio and the position of the gear wheels relative to each other.

The angle drive with crown wheel teeth has a number of special advantages over the conical gear drive generally known and used, such as, inter alia, the absence of any need for axial adjustment of the cylindrical pinion, a greater gear ratio being achievable, and a great mesh quotient which is achievable without special provisions.

The lack of an economically feasible, and thus accurate manufacturing method was, however, hitherto one of the greatest disadvantages for a general application of the crown wheel gear in highly loaded constructions. The lack of suitable manufacturing equipment played a major role in this.

The use of hobbing tools, by means of which crown wheels can be produced in a continuous generation process, is in practice a condition for the economic production of crown wheels and for a wider application of crown wheels in highly loaded and/or high-speed constructions.

A hobbing cutter for the production of crown wheels by means of a generating process is known from U.S. Pat. No. 2,304,586 (Miller). This cutter comprises a disc-shaped cutter element with cutting teeth provided on the periphery. The cutting edges of said cutting teeth lie in a surface of rotation produced by the rotation of an imaginary gear wheel of infinitely small thickness about the axis of the cutter element and simultaneously about its own axis, the imaginary gear wheel on one revolution about the axis of the cutter element rotating about its own axis through an angle which is equal to a whole number of times the pitch angle of the imaginary gear wheel, and the surface of the imaginary gear wheel always extending in the radial direction of the cutter element and at right angles to the path described by the imaginary gear wheel.

The cutting edge of the cutting teeth of this known hobbing cutter is always the shape of the outer contour of a cross-section of a segment of a pinion with which a crown wheel being produced is to mesh. The cutting teeth of the known hobbing cutter are provided with clearance faces in the same way as conventional cutting teeth of a cutter. This means that grinding the cutting edges of cutting teeth which have become blunt produces a change in the shape of the cutting edges of the hobbing cutter. The newly ground hobbing cutter generates a crown wheel which can only mesh in the optimum way with a pinion of which the shape of the outer contour of the cross-section is the same as the modified shape of the cutting edges of the hobbing cutter. This is a great disadvantage for exchangeability, and thus for efficient production and a general use of crown wheels.

A similar problem also occurs with hobbing grinding discs for the production of crown wheels which are the same basic shape as the known hobbing cutter. For, dressing such a hobbing grinding disc will cause the shape of the grinding surface to change, and thereby also the shape of a crown wheel ground with such a grinding disc.

SUMMARY OF THE INVENTION

The object of the present invention is to provide a hobbing tool for the production of crown wheels with which, even after resharpening, crown wheels with exactly the same tooth shape as before the sharpening can be produced.

This object is achieved by a tool for producing crown wheels by means of a generating process, in which a tool and a workpiece rotate with a constant ratio of the speeds of rotation and move in such a way relative to each other that the tool works continuously, which tool comprises a disc which is rotatable about its axis, with machining elements which are provided on the periphery thereof and the cutting edges of which lie in the outer surface of a profile determining the shape of the teeth of a crown wheel to be produced with the tool, said profile extending essentially helically over the periphery of the disc, and each cross-section of said helical profile at right angles to the helix direction of the profile being produced being the shape of a segment of an imaginary gear wheel of infinitely small thickness, the centre point of which lies on a circle which lies in a plane at right angles to the axis of rotation of the tool, and the centre point of which lies on said axis of rotation, while the pitch of the helical profile is such that on one complete revolution about the axis of rotation of the tool, viewed in cross-section of the helical profile, the imaginary gear wheel rotates about its centre point over one or more tooth pitches, characterised in that in each cross-section of the helical profile the outer contour of the cross-section at least is composed of a part of the outer contour of the tooth profile of the imaginary gear wheel with involute gear teeth and lines connecting thereto, in such a way that in each of the teeth with a tooth tip and two tooth flanks bounded by the outer contour of the cross-section the distance between each of the two tooth flanks and a line at right angles to the axis of rotation of the tool and passing through the tooth tip remains the same or increases from the tooth tip to the axis of rotation of the tool.

The invention is based on the recognition that when the known hobbing cutter is used for the production of crown wheels the tooth flank of the crown wheels is worked by only a part of the cutting edges of the cutter teeth. This is connected with the fact that the pressure angle of the teeth of a crown wheel to be produced always lies within certain limits, the minimum pressure angle always being equal to or greater than 0°.

With the tool according to the invention, crown wheels of the desired shape can be produced by means of a generating process, while after possible resharpening of the tool, crown wheels with exactly the same desired shape can be produced again. The helical profile of the tool according to the invention determining the shape of the teeth of a crown wheel to be produced is in fact free from undercuts, viewed in the radial direction of the tool towards the axis of rotation, which means that after resharpening of the tool ,exactly the same profile can be obtained again.

The invention also relates to a method for producing a tool for producing crown wheels by means of a generating process, in which a tool and a workpiece rotate with a constant ratio between the speeds of rotation, and move in such a way relative to each other that the tool works continuously, which tool comprises a disc which can rotate about its axis and has disposed on its periphery machining elements whose cutting edges lie in the outer surface of a profile which determines the shape of the teeth of a crown wheel to be produced with the tool, and which extends essentially helically over the periphery of the disc, each cross-section of said helical profile at right angles to the helix direction of the profile being produced being the shape of a segment of an imaginary gear wheel of infinitely small thickness, the centre point of which lies on a circle which lies in a plane at right angles to the axis of rotation of the tool, and the centre point of which lies on said axis of rotation, while the pitch of the helical profile is such that on one complete revolution about the axis of rotation of the tool, viewed in cross-section of the helical profile, the imaginary gear wheel rotates about its centre point over one or more tooth pitches, characterised by the following steps:

advance shaping of a disc-shaped base element from which the tool can be produced and of which the external dimensions correspond essentially to the external dimensions of the tool to be produced;

rotation of the base element about its axis;

the movement in several successive working operations along the rotating base element of a working tool for working the base element to the desired tool; on each working operation the working tool generating a line V which a) lies in a plane W which forms an angle $\gamma$ with the axis of rotation, of the base element, for which the following applies:

$$\gamma = \text{arctg} \frac{m\,n}{2R},$$

in which:

m=circumferential module of a pinion with involute gear teeth which must mesh with a crown wheel to be produced by the tool;

n=number of tooth pitches, over which the imaginary gear wheel rotates about its centre point with one complete revolution of the tool; and R=sum of the distance of the axis of rotation of the tool from the centre point of the imaginary gear wheel and the radius of the pitch circle of the imaginary gear wheel;

and b) forms an angle $\alpha$ flank with the line which goes through the point of intersection of the axis of rotation of the base element with the plane W and lies at right angles to said axis of rotation; in each working operation the rate of feed v of the working tool in the direction of the axis of rotation of the base element being determined by the relation:

$$v = \frac{\omega m\,n \cos(\alpha n)}{2\cos(\alpha\;\text{flank})} \cdot \frac{1}{\cos \gamma}$$

in which:
$\omega$=angular speed of the rotating base element
m,n=as indicated above
$\alpha n$=normal pressure angle of a pinion with involute gear teeth which has to mesh with a crown wheel to be produced with the tool; and
$\gamma$=as indicated above and where in the successive working operations the angle $\alpha$ flank is in each case adapted in such a way that the angle $\alpha$ flank runs through the angle range between $\alpha$ min and $\alpha$ max in steps.

BRIEF DESCRIPTION OF THE DRAWINGS

The invention is explained in greater detail in the example of an embodiment which follows with reference to the appended drawing, in which:

FIG. 1 is an end view of a known hobbing cutter, during the production of a crown wheel, which is partially shown;

FIG. 2 is a side view of the known cutter, viewed from the left side in FIG. 1;

FIG. 3 is a radial cross-section of the known cutter along the line III—III in FIG. 1;

DETAILED DESCRIPTION OF THE INVENTION

Figure 4:
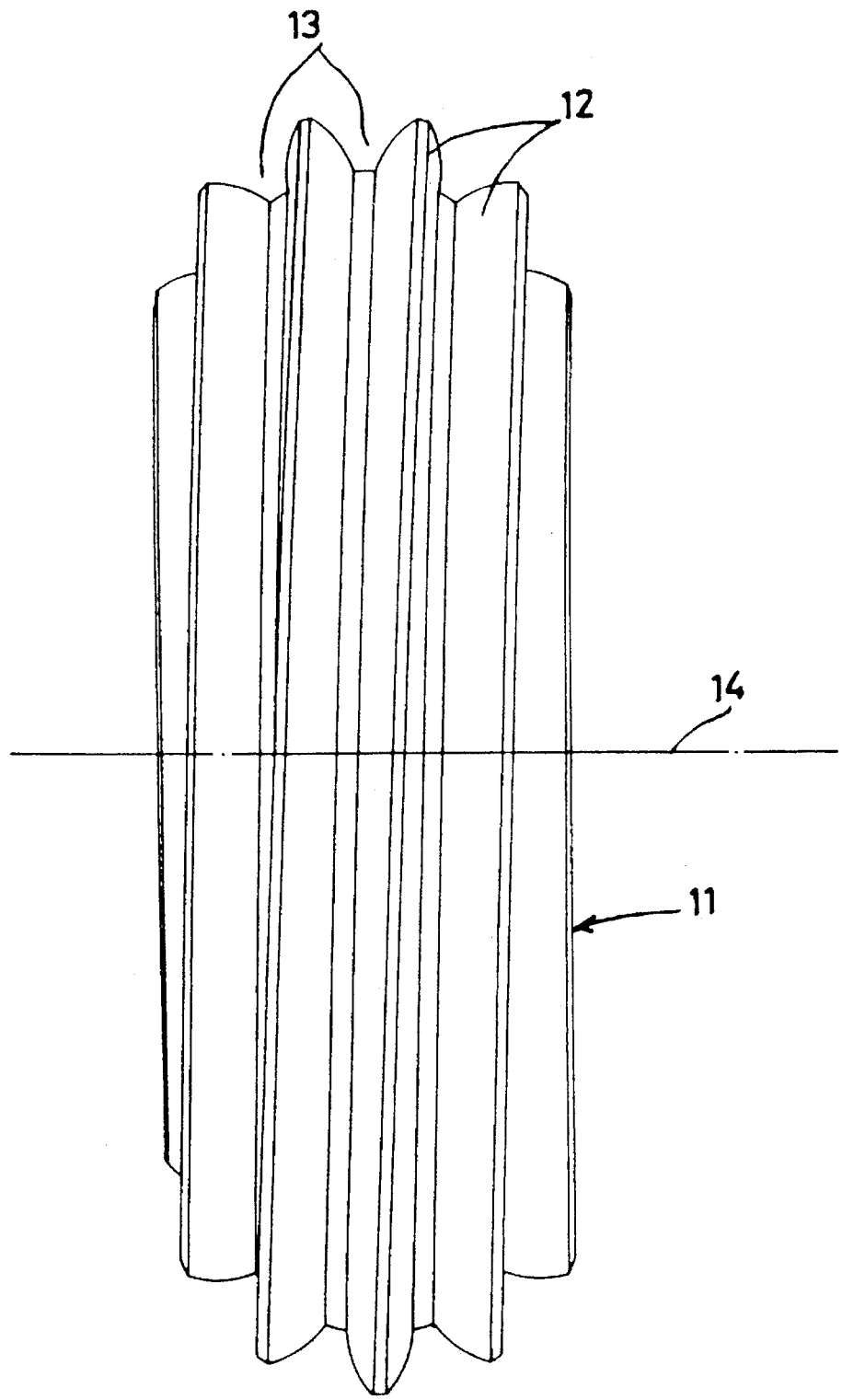
FIG. 4 is a view of a hobbing grinding disc with the same basic shape as the known hobbing cutter of FIG. 1.

FIGS. 1–3 show a known hobbing cutter for producing crown wheels. This known cutter is described in detail in U.S. Pat. No. 2,304,586 (Miller), to which you are referred.

The cutter comprises a disc-shaped cutter element 1 with cutting teeth 2 provided on the periphery. The cutting edges 3 of said cutting teeth are situated in a surface of revolution which is produced by turning an imaginary gear wheel 6 of infinitely small thickness about the axis 4 of the clutter element and simultaneously about its own axis 5, in the course of which the imaginary gear wheel on one rotation about the axis turns through an angle equal to a whole number of times the pitch angle of the imaginary gear wheel, and the plane of the imaginary gear wheel always extends in the radial direction of the cutter element and at right angles to the path described by the teeth of the imaginary gear wheel. The shape of the imaginary gear wheel 6 corresponds essentially to the shape of the pinion which has to mesh with the crown wheel 7 to be produced.

The cutting teeth 2 of the cutter are provided with clearance faces in the same way as conventional cutting teeth of a cutter.

The above-mentioned surface of revolution can be regarded as an imaginary plane which is formed by the outer surface of a series of adjacent ribs imagined on the periphery of a disc, extending in the peripheral direction of the disc, with valleys between them. Each cross-section of the ribs and valleys at right angles to the lengthwise direction of the ribs is the shape of a part of an imaginary gear wheel 6, the central axes of the teeth of said gear wheel part having a common intersection point 5 which lies on a circle whose centre point lies on the axis 4 of rotation of the disc. The central axes of the teeth always enclose an angle $\phi$. In the peripheral direction of the disc the central axes of the teeth of the gear wheel part turn about the common intersection point 5 through an angle $\phi$, the angle between two adjacent central axes, with the result that the ribs follow, as it were, a helical course. The surface of revolution can also be seen as a profile determining the shape of the teeth of a crown wheel to be produced and extending essentially helically over the periphery of the cutter element.

A hobbing cutter is described here as an example of the known state of the art. It is, of course, also possible to work a crown wheel with a hobbing grinding disc of the same basic form, i.e. comprising a disc which is rotatable about its axis and has disposed on the periphery of the disc a series of adjacent ribs extending in the peripheral direction of the disc and having valleys lying between them, the ribs being provided with grinding material of which the cutting edges lie in the above-mentioned imaginary plane. Such a hobbing grinding disc is shown in FIG. 4 in a view in the radial direction. The grinding disc element is indicated by 11 and the ribs and valleys provided on the periphery are indicated by 12 and 13 respectively. The axis of rotation of the disc is indicated, by 14.

When a hobbing cutter or hobbing grinding disc according, to the state of the art has become blunt this tool can, of course, be resharpened. A cutter is ground for this purpose and a grinding disc is dressed again. However, when the tool is resharpened the shape of the machining parts of the tool will change, with the result that crown wheels with the same tooth shape as before the resharpening cannot be produced with the newly sharpened tool.

This is possible with the tool according to the present invention. For, in this case the cutting edges of the machining elements lie in an imaginary plane with a shape which is modified compared with the above-mentioned imaginary plane according to the state of the art, as will be described below. This modification has no influence on the shape of the teeth of a crown wheel to be produced. In the case of a tool according to the state of the art, as stated before, only a part of the cutting edges is actually active as a cutting edge in the production of crown wheels.

Figure 5:
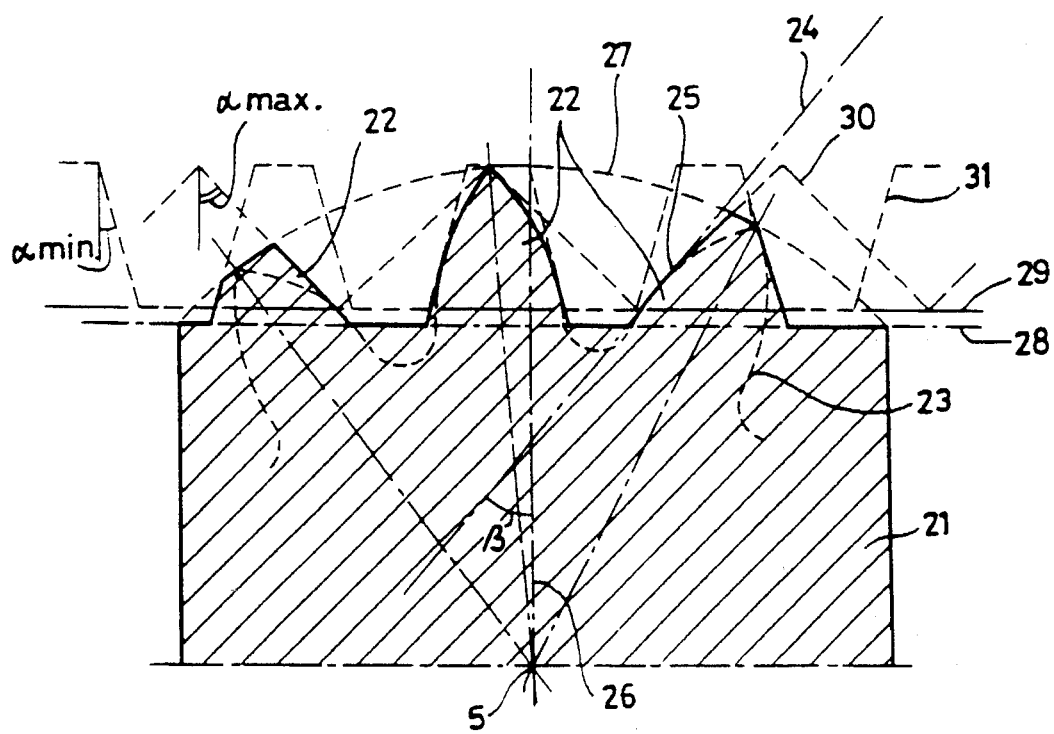
FIGS. 5, 6 and 7 are three ,different cross-sections of the peripheral part of a tool according to the invention.
Figure 6:
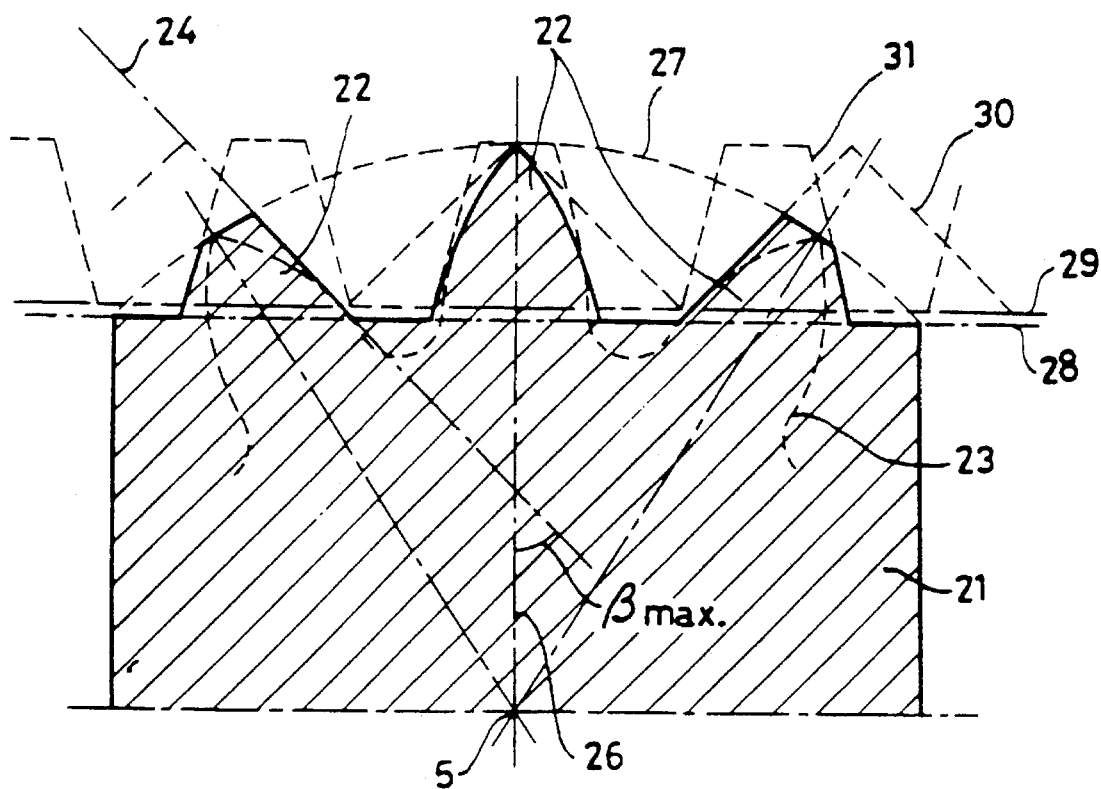
Figure 7:
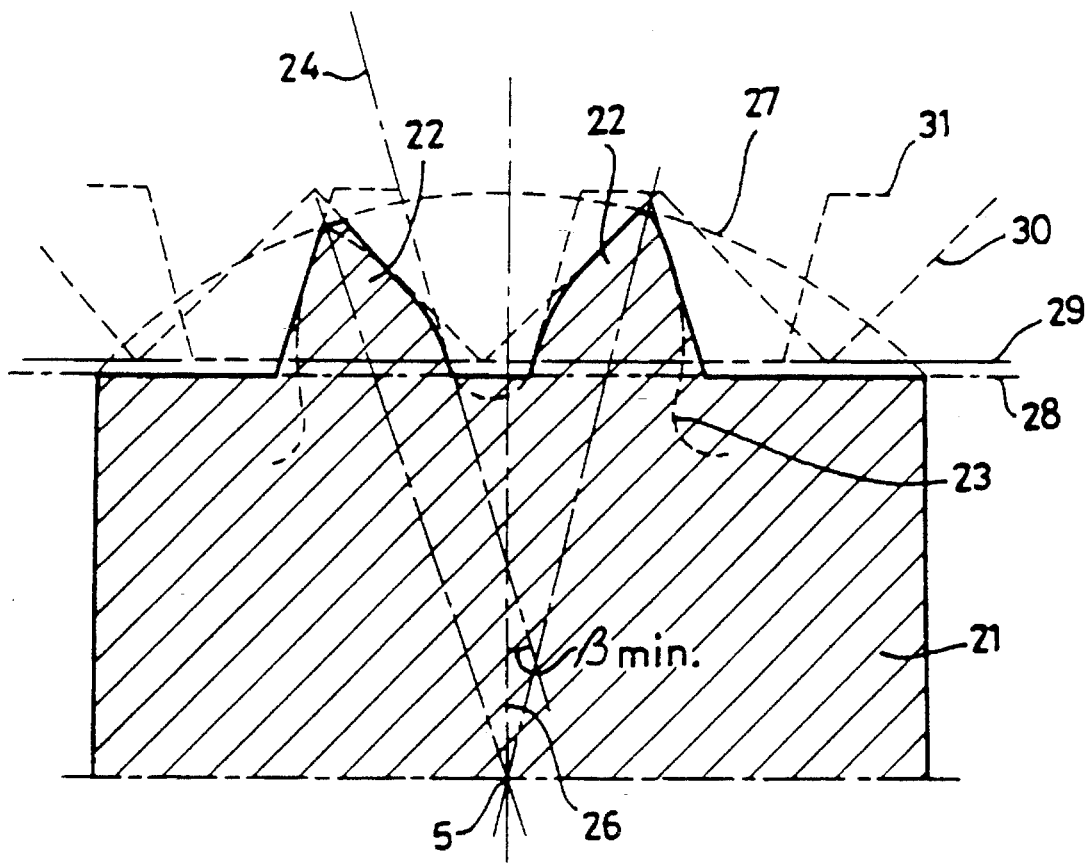

FIGS. 5–7 show schematically three different cross-sections of the peripheral part 21 of a hobbing tool according to the invention at right angles to the ribs 22 disposed or imagined on the periphery of the tool. In these cross-sections the shape of a part of the imaginary gear wheel mentioned earlier is indicated by a broken line 23. According to the state of the art, the cutting edges of the tool should lie on said line 23. The shape of each cross-section of the ribs 22 is, however, according to the invention such that in the case of each of the teeth with a tooth tip and two tooth flanks bounded by the outer contour of the cross-section the distance of each of the two tooth flanks from a line (not shown) at right angles to the axis of rotation (not shown) of the tool and passing through the tooth tip remains the same or increases from the tooth tip to the axis of rotation of the tool or, in other words, a line of contact 24 on the outer contour 25 of said cross-section forms an angle β equal to or greater than 0° with a line 26 at right angles to the axis of rotation of the disc-shaped tool. This means that, viewed in the radial direction of the disc, towards the axis of rotation, the ribs are free from undercuts. This makes it possible to resharpen the tool by grinding (in the case of a cutter) or dressing (in the case of a grinding disc) without the cross-section shape of the ribs 22 being changed as a result.

FIGS. 5–7 show a preferred embodiment, in which the angle β which forms a line of contact 24 on the outer contour 25 of the cross-section of the ribs 22 with the line 26 is at least equal to an angle α min, in which α min is maximum equal to the smallest pressure angle (for example, 5° of a crown wheel to be produced, and maximum equal to an angle α max, in which α max is at least equal to the largest pressure angle (for example 45°) of a crown wheel to be produced. The cross-section of the ribs 22 need only have this form in a region which is bounded at one side by a circle 27 which coincides with the tip circle of the schematically shown part 23 of the imaginary gear wheel and at the other side by a line 28 running parallel to the axis of rotation of the disc-shaped tool and lying at a distance from the axis of rotation which is equal to or slightly smaller than the distance of the axis of rotation of the tool from the end face of a crown wheel to be produced, here indicated by the line 29.

It can also be seen from FIGS. 5–7 that the outer contour of each cross-section is in fact composed of at least a part of the outer contour of the tooth profile of a gear wheel 23 with involute gear teeth, of which the center point lies in point 5 and a part of the outer contour of the tooth profile of two gear racks 30, 31 with different pressure angles interacting with the gear wheel. On the outer contour of at least one tooth of the cross-section the involute in the region of the tip and/or the base merges into a straight line. The gear racks 30 and 31 have pressure angles which are equal to α max and α min respectively.

It is, however, also possible in a slightly different embodiment of the tool to make the involute merge into a curved line instead of a straight line, provided that the angle β is equal to or greater than 0°.

In FIGS. 5–7 in the region bounded by the circle 27 and the line 28 the ribs 22 broaden increasingly in the radial direction towards the axis of rotation of the tool. This means that after the removal of a thin layer of material from the surface of the ribs 22 for resharpening of the tool the ribs 22 can still have the same cross-section shape. With a resharpened tool it is thus possible to produce crown wheels with exactly the same tooth shape as before the resharpening.

The hobbing tool according to the invention can be a hobbing cutter in the form of a disc with cutting teeth disposed on and regularly distributed over the periphery. The cutting edges of said cutting teeth then lie in the imaginary plane of modified shape described above which is formed by the ribs imagined on the periphery of the disc. The cutting edges can be, for example, of a shape such as that shown in FIGS. 5–7.

The hobbing tool according to the invention can also be a hobbing grinding disc in the form of a disc with disposed on the periphery a series of continuous adjacent ribs extending in the peripheral direction. These ribs are provided with grinding material on their surface, in such a way that the cutting edges of the grinding material lie in the imaginary plane of modified shape described above. The ribs can have a cross-section such as that shown in FIGS. 5–7.

If, in the event of the hobbing tool being a hobbing cutter, each cutter tooth is a shape according to international patent application PCT/NL/90/00141 (not a prior publication), where in different cross-sections of the cutter tooth lying after one another from the front side of the cutter tooth to the rear side of the cutter tooth the profile of the cutter tooth shifts substantially in the direction of the axis of rotation of the cutter, each cutter tooth will be provided with clearance faces, due to the fact that the cutting edges lie in the imaginary plane of modified shape described above.

A tool according to the invention of the type shown in FIGS. 5–7 can be produced as follows, particular reference being made to FIG. 8, which shows a cross-section corresponding to FIG. 5.

A disc-shaped base element 41 is first formed, from which element the tool can be produced, and of which the external dimensions correspond essentially to those of the tool to be produced. Such a base element is preferably in the form of a disc with parallel radial end faces 43 and 44 and a peripheral face whose shape corresponds essentially to the external shape of the tool to be produced. In FIG. 8 this peripheral face in cross-section is the shape of a segment of a circle with a radius which is greater than the radius of the tip circle of a pinion which is to mesh with a crown wheel to be produced with the tool. The base element 42 is rotated about its axis (not shown) and along the rotating base element a working tool 46 is moved several times in succession for shaping the base element to the desired hobbing tool. The working tool 46 is, for example, a cutter, a grinding tool (for grinding a hobbing cutter) or a dressing tool (for dressing a hobbing grinding disc). The shape of the working tool 46 and its position relative to the base element during the working of said base element is such that during said working, in which the base element 42 rotates about its axis, the working tool during each working operation generates a line V lying in a plane W which corresponds to the plane of drawing in FIG. 8. The plane W lies at right angles to the lengthwise direction of the ribs 47 to be formed, and thus encloses an angle $\gamma$ with the axis of rotation of the disc, for which the following applies:

$$\gamma = \text{arctg}\, \frac{m\,n}{2R},$$

in which:

m=circumferential module of a pinion with involute gear teeth which must mesh with a crown wheel to be produced by the hobbing tool;

n=number of times that the central axis 48 of a rib 47 to be formed rotates through an angle $\phi$ (the angle between two adjacent central axes) about the intersection point 5 on one full revolution of the base element about its axis of rotation; and R=sum of the distance of the axis of rotation of the base element from the intersection point 5 and the radius of the pitch circle of the pinion indicated by 23.

The line V encloses a certain angle $\alpha$ flank with the line 49 passing through the intersection point of the axis of rotation of the base element with the plane W and lying at right angles to said axis of rotation. The angle $\alpha$ flank lies in a range which is bounded on the one hand by the angle $\alpha$ min and on the other by the angle $\alpha$ max. During the successive working operations of the working tool 46 along the base element 42 the angle $\alpha$ flank will vary and in each case be adapted in such a way that the angle $\alpha$ flank runs through the entire angle range between $\alpha$ min and $\alpha$ max in steps of 1°–5°, and preferably of 3°. The range of the angle $\alpha$ flank is preferably passed through with decreasing angle $\alpha$ flank. The first working then takes place at $\alpha$ flank=$\alpha$ max, and the last working at $\alpha$ flank=$\alpha$ mint so that the part to be worked is supported to the maximum degree.

The feed of the working tool will preferably take place in a direction at right angles to the lengthwise direction of the ribs to be formed, thus in the plane W. The feed direction in the plane W can in this case always be at right angles to the line 49, or for each working operation in each case at right angles to the line V.

If the angle is small (smaller than about 7°), it is also possible to give the working tool a feed in a direction parallel to the axis of rotation of the base element. The deviation from the theoretically desired shape of the tool is then negligible.

The rate of feed v during each working operation of the working tool 46 along the base element 42 in the direction of the axis of rotation of the base element is determined by the relation:

$$v = \frac{\omega m\, n \cos(\alpha n)}{2 \cos(\alpha\,\text{flank})} \cdot \frac{1}{\cos \gamma}$$

in which:

$\omega$=angular speed of the rotating base element m,n=as indicated above $\alpha$ n=normal pressure angle of a pinion with involute gear teeth which has to mesh with a crown wheel to be produced with the tool;

$\gamma$=as indicated above

It will also be clear that during the different working operations of the working tool 46 along the base element 42, where the angle $\alpha$ flank and the rate of feed v always differ, the initial position of the working tool in the direction of movement must always be set in such a way that the flank of the ribs 47 in cross-section comprises a part of the involute, namely the involute of the pinion which has to be able to mesh with the crown wheel to be produced.

Figure 8:
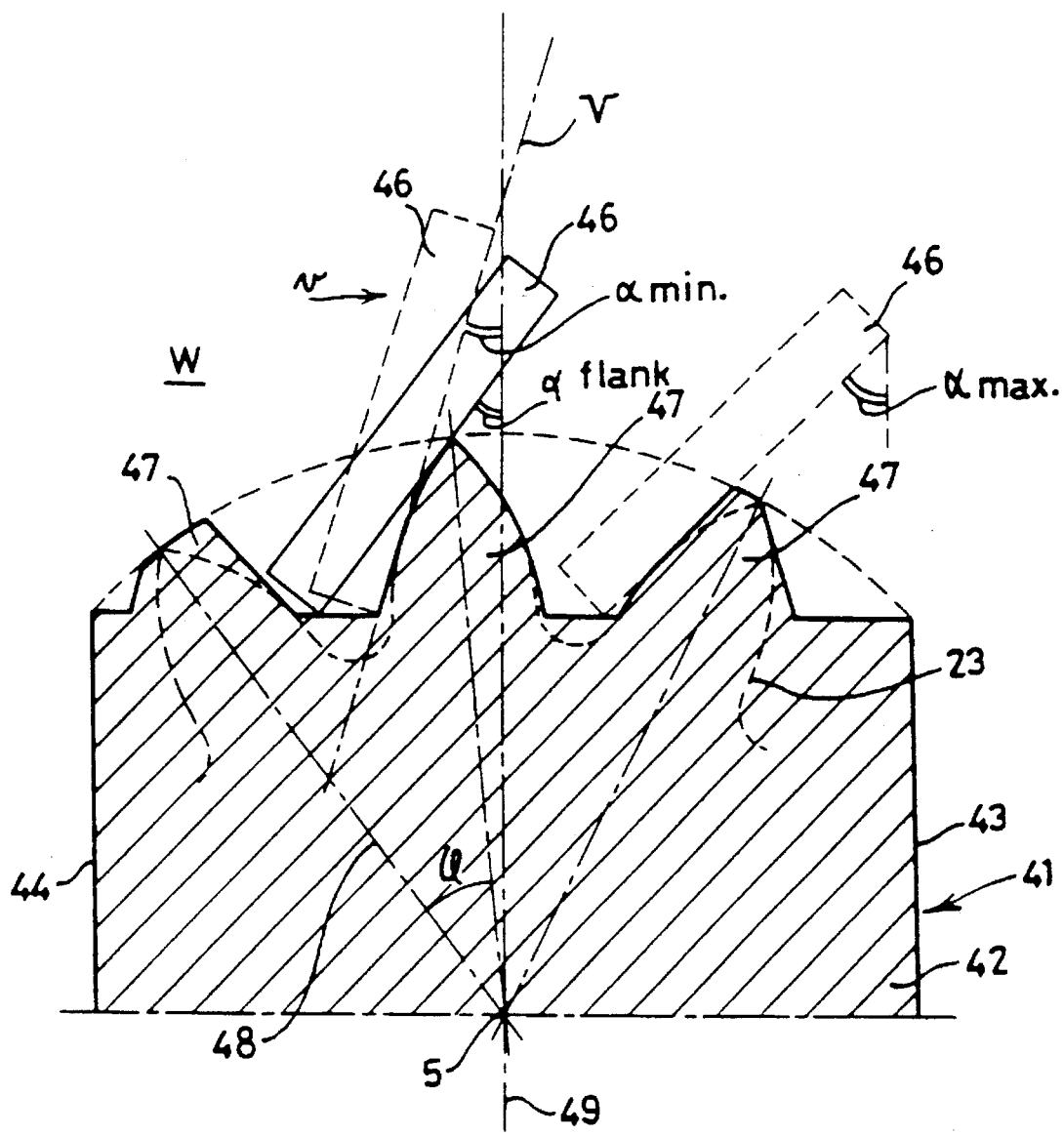
FIG. 8 is a cross-section corresponding to FIG. 5, in which a working tool for shaping the tool according to the invention is also shown.

FIG. 8 shows the working tool during the working of the left flank of the ribs 47. Of course, the above also applies to the working of the right flank of the ribs. The angle $\alpha$ flank then lies on the other side of the line 49.

Depending on the shape of the peripheral face of the base element, the flanks of the ribs 47 will coincide in a pointed, possibly rounded, tip of the rib and/or end in the peripheral face mentioned earlier. In FIG. 8 the two outermost ribs are flattened. The flanks of said ribs could, however, also run upwards until they coincide in a pointed, possibly rounded, tip.

The minimum distance of the working tool 46 from the axis of rotation of the base element is equal to or slightly smaller than the distance of the axis of rotation of the hobbing tool from the top side of the teeth of a crown wheel to be produced, during the production of the latter.

In practice, the bottom region of the between the ribs 47 will essentially be the shape of a cylinder of which the central axis coincides with the axis of rotation of the base element, and which has such a radius that during the production of a crown wheel the top side of the teeth of the crown wheel always lies clear of the tool.

We claim:

1. Tool for producing crown wheels by means of a generating process, in which the tool and a workpiece rotate at a constant ratio of the speeds of rotation and move relative to each other so that the tool works continuously, said tool comprising: a disc having an axis of rotation and a periphery with machining elements provided on said periphery, cutting edges of the machining elements defining an outer surface of a profile determining the shape of the teeth of a crown wheel to be produced by the tool, said profile extending substantially helically over the periphery of the disc thereby defining a helix direction, and each cross-section of said helical profile at right angles to the helix direction of the profile being produced being of the shape of a segment of an imaginary gear wheel of infinitely small thickness with a center point thereof on a circle in a plane at right angles to the axis of rotation of the tool, and the center point lies on said axis of rotation, and the pitch of the helical profile is such that for one complete revolution about the axis of rotation of the tool, viewed in cross-section to the helical profile, the imaginary gear wheel rotates about its center point over one or more tooth pitches, in each cross-section of the helical profile the outer contour of the cross-section being composed of at least a part of the outer contour of the tooth profile of the imaginary gear wheel with involute gear teeth and lines connecting thereto, such that each of the teeth having a tooth tip and two tooth flanks bounded by the outer contour of the cross-section, the distance between each of the two tooth flanks and a line at right angles to the axis of rotation of the tool and passing through the tooth tip remains the same or increases from the tooth tip to the axis of rotation of the tool.

2. Tool according to claim 1, wherein in each cross-section of the helical profile the outer contour of the cross-section at least is composed of a part of the outer contour of the imaginary gear wheel with involute teeth and a part of the outer contour of the tooth profile of one or more gear racks with different pressure angles which can mesh with the imaginary gear wheel, so that straight parts connect in a contacting manner to parts of the outer contour of the cross-section with an involute form.

3. Tool according to claim 2, wherein in each cross-section of the helical profile a line of contact on a tooth flank forms an angle β with a line lying at right angles to the axis of rotation of the tool which is equal to or greater than an angle α min, where α min is maximum the value of the smallest pressure angle of a crown wheel to be produced with the tool.

4. Tool according to claim 2, wherein in each cross-section of the helical profile a line of contact on a tooth flank forms an angle β with a line lying at right angles to the axis of rotation of the tool which is equal to or greater than an angle α max, where α max is minimum the value of the greatest pressure angle of a crown wheel to be produced with the tool.

5. Tool according to claim 1, wherein the bottom region of the helical profile is substantially the shape of a cylinder whose central axis coincides with the axis of rotation of the tool, and which has such a radius that during the production of a crown wheel the top side of the teeth of the crown wheel always lies clear of the tool.

6. Tool according to claim 1, wherein in each cross-section of the helical profile the two tooth flanks of at least one of the teeth bounded by the outer contour of the cross-section coincide in a pointed tooth tip.

7. Tool according to claim 1, wherein in each cross-section of the helical profile the tooth tips of the teeth bounded by the outer contour of the cross-section lie on a circle with a centre point which coincides with the centre point of the imaginary gear wheel and with a radius which is greater than the radius of the tip circle of a pinion which has to mesh with a crown wheel to be produced by the tool.

8. Tool according to claim 1, wherein the tool is a grinding tool in the form of a disc with disposed on the periphery a series of continuous adjacent ribs extending essentially helically in the peripheral direction and provided with grinding material on their surface, in such a way that the cutting edges of the grinding material lie in the outer surface of the helical profile.

9. Tool according to claim 1, wherein the tool is a cutting tool in the form of a disc having disposed on the periphery and regularly distributed over the periphery cutter teeth which are provided with cutting edges which lie in the outer surface of the helical profile.

10. Tool according to claim 9, wherein each cutter tooth is of such a shape that in different cross-sections of the cutter tooth lying after one another in the lengthwise direction of the helical profile from the front side of the cutter tooth to the rear side of the cutter tooth the profile of the cutter tooth shifts substantially in the direction of the axis of rotation of the tool, with the result that the cutter teeth will be provided with clearance angles.

11. Tool according to claim 1, wherein in each cross-section of the helical profile the two tooth flanks of at least one of the teeth bounded by the outer contour of the cross-section coincide in a rounded tooth tip.

12. Tool for producing crown wheels by means of a generating process, in which the tool and a workpiece rotate at a constant ratio of the speeds of rotation and move relative to each other so that the tool works continuously, said tool comprising: a disc having an axis of rotation and a periphery with machining elements provided on said periphery, cutting edges of the machining elements defining an outer surface of a profile determining the shape of the teeth of a crown wheel to be produced by the tool, said profile extending substantially helically over the periphery of the disc thereby defining a helix direction, and each cross-section of said helical profile at right angles to the helix direction of the profile being produced being of the shape of a segment of an imaginary gear wheel of infinitely small thickness with a center point thereof on a circle in a plane at right angles to the axis of rotation of the tool, and the center point lies on said axis of rotation, and the pitch of the helical profile is such that for one complete revolution about the axis of rotation of the tool, viewed in cross-section to the helical profile, the imaginary gear wheel rotates about its center point over one or more tooth pitches, in each cross-section of the helical profile the outer contour of the cross-section being composed of at least a part of the outer contour of the tooth profile of the imaginary gear wheel with involute gear teeth and lines connecting thereto, such that each of the teeth having a tooth tip and two tooth flanks bounded by the outer contour of the cross-section, the distance between each of the two tooth flanks and a line at right angles to the axis of rotation of the tool and passing through the tooth tip remains the same or increases from the tooth tip to the axis of rotation of the tool, and in each cross-section of the helical profile the outer contour of the cross-section at least being composed of a part of the outer contour of the imaginary gear wheel with involute teeth and a part of the outer contour of the tooth profile of one or more gear racks with different pressure angles which can mesh with the imaginary gear wheel, so that straight parts connect in a contacting manner to parts of the outer contour of the cross-section with an involute form.

13. Tool according to claim 12, wherein in each cross-section of the helical profile a line of contact on a tooth flank forms an angle β with a line lying at right angles to the axis of rotation of the tool which is equal to or greater than an angle α min, where α min is maximum the value of the smallest pressure angle of a crown wheel to be produced with the tool.

14. Tool according to claim 12, wherein in each cross-section of the helical profile a line of contact on a tooth flank forms an angle β with a line lying at right angles to the axis of rotation of the tool which is equal to or greater than an angle α max, where α max is minimum the value of the greatest pressure angle of a crown wheel to be produced with the tool.

15. Tool for producing crown wheels by means of a generating process, in which the tool and a workpiece rotate at a constant ratio of the speeds of rotation and move relative to each other so that the tool works continuously, said tool comprising: a disc having an axis of rotation and a periphery with machining elements provided on said periphery, cutting edges of the machining elements defining an outer surface of a profile determining the shape of the teeth of a crown wheel to be produced by the tool, said profile extending substantially helically over the periphery of the disc thereby defining a helix direction, and each cross-section of said helical profile at right angles to the helix direction of the profile being produced being of the shape of a segment of an imaginary gear wheel of infinitely small thickness with a center point thereof on a circle in a plane at right angles to the axis of rotation of the tool, and the center point lies on said axis of rotation, and the pitch of the helical profile is such that for one complete revolution about the axis of rotation of the tool, viewed in cross-section to the helical profile, the imaginary gear wheel rotates about its center point over one or more tooth pitches, in each cross-section of the helical profile the outer contour of the cross-section being composed of at least a part of the outer contour of the tooth profile of the imaginary gear wheel with involute gear teeth and lines connecting thereto, such that each of the teeth having a tooth tip and two tooth flanks bounded by the outer contour of the cross-section, the distance between each of the two tooth flanks and a line at right angles to the axis of rotation of the tool and passing through the tooth tip remains the same or increases from the tooth tip to the axis of rotation of the tool, and in each cross-section of the helical profile the two tooth flanks of at least one of the teeth bounded by the outer contour of the cross-section coincide in a pointed tooth tip.

16. Tool for producing crown wheels by means of a generating process, in which the tool and a workpiece rotate at a constant ratio of the speeds of rotation and move relative to each other so that the tool works continuously, said tool comprising: a disc having an axis of rotation and a periphery with machining elements provided on said periphery, cutting edges of the machining elements defining an outer surface of a profile determining the shape of the teeth of a crown wheel to be produced by the tool, said profile extending substantially helically over the periphery of the disc thereby defining a helix direction, and each cross-section of said helical profile at right angles to the helix direction of the profile being produced being of the shape of a segment of an imaginary gear wheel of infinitely small thickness with a center point thereof on a circle in a plane at right angles to the axis of rotation of the tool, and the center point lies on said axis of rotation, and the pitch of the helical profile is such that for one complete revolution about the axis of rotation of the tool, viewed in cross-section to the helical profile, the imaginary gear wheel rotates about its center point over one or more tooth pitches, in each cross-section of the helical profile the outer contour of the cross-section being composed of at least a part of the outer contour of the tooth profile of the imaginary gear wheel with involute gear teeth and lines connecting thereto, such that each of the teeth having a tooth tip and two tooth flanks bounded by the outer contour of the cross-section, the distance between each of the two tooth flanks and a line at right angles to the axis of rotation of the tool and passing through the tooth tip remains the same or increases from the tooth tip to the axis of rotation of the tool, and in each cross-section of the helical profile the tooth tips of the teeth bounded by the outer contour of the cross-section lie on a circle with a center point which coincides with the center point of the imaginary gear wheel and with a radius which is greater than the radius of the tip circle of a pinion which has to mesh with a crown wheel to be produced by the tool.

17. Tool for producing crown wheels by means of a generating process, in which the tool and a workpiece rotate at a constant ratio of the speeds of rotation and move relative to each other so that the tool works continuously, said tool comprising: a disc having an axis of rotation and a periphery with machining elements provided on said periphery, cutting edges of the machining elements defining an outer surface of a profile determining the shape of the teeth of a crown wheel to be produced by the tool, said profile extending substantially helically over the periphery of the disc thereby defining a helix direction, and each cross-section of said helical profile at right angles to the helix direction of the profile being produced being of the shape of a segment of an imaginary gear wheel of infinitely small thickness with a center point thereof on a circle in a plane at right angles to the axis of rotation of the tool, and the center point lies on said axis of rotation, and the pitch of the helical profile is such that for one complete revolution about the axis of rotation of the tool, viewed in cross-section to the helical profile, the imaginary gear wheel rotates about its center point over one or more tooth pitches, in each cross-section of the helical profile the outer contour of the cross-section being composed of at least a part of the outer contour of the tooth profile of the imaginary gear wheel with involute gear teeth and lines connecting thereto, such that each of the teeth having a tooth tip and two tooth flanks bounded by the outer contour of the cross-section, the distance between each of the two tooth flanks and a line at right angles to the axis of rotation of the tool and passing through the tooth tip remains the same or increases from the tooth tip to the axis of rotation of the tool, and the tool is a cutting tool in the form of a disc having disposed on the periphery and regularly distributed over the periphery cutter teeth which are provided with cutting edges which lie in the outer surface of the helical profile.

18. Tool according to claim 17, wherein each cutter tooth is of such a shape that in different cross-sections of the cutter tooth lying after one another in the lengthwise direction of the helical profile from the front side of the cutter tooth to the rear side of the cutter tooth the profile of the cutter tooth shifts substantially in the direction of the axis of rotation of the tool, with the result that the cutter teeth will be provided with clearance angles.

19. Tool for producing crown wheels by means of a generating process, in which the tool and a workpiece rotate at a constant ratio of the speeds of rotation and move relative to each other so that the tool works continuously, said tool comprising: a disc having an axis of rotation and a periphery with machining elements provided on said periphery, cutting edges of the machining elements defining an outer surface of a profile determining the shape of the teeth of a crown wheel to be produced by the tool, said profile extending substantially helically over the periphery of the disc thereby defining a helix direction, and each cross-section of said helical profile at right angles to the helix direction of the profile being produced being of the shape of a segment of an imaginary gear wheel of infinitely small thickness with a center point thereof on a circle in a plane at right angles to the axis of rotation of the tool, and the center point lies on said axis of rotation, and the pitch of the helical profile is such that for one complete revolution about the axis of rotation of the tool, viewed in cross-section to the helical profile, the imaginary gear wheel rotates about its center point over one or more tooth pitches, in each cross-section of the helical profile the outer contour of the cross-section being composed of at least a part of the outer contour of the tooth profile of the imaginary gear wheel with involute gear teeth and lines connecting thereto, such that each of the teeth having a tooth tip and two tooth flanks bounded by the outer contour of the cross-section, the distance between each of the two tooth flanks and a line at right angles to the axis of rotation of the tool and passing through the tooth tip remains the same or increases from the tooth tip to the axis of rotation of the tool, and in each cross-section of the helical profile the two tooth flanks of at least one of the teeth bounded by the outer contour of the cross-section coincide in a rounded tooth tip.

* * * * *